US012775587B2

(12) United States Patent
Mayo et al.

(10) Patent No.: US 12,775,587 B2
(45) Date of Patent: Oct. 27, 2026

(54) MANAGING CONTAINER INDEXES OF A DEDUPLICATION STORAGE SYSTEM

(71) Applicant: Hewlett Packard Enterprise Development LP, Spring, TX (US)

(72) Inventors: Richard Phillip Mayo, Bristol (GB); Treeve White, Bristol (GB); Callum Murray, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/928,298

(22) Filed: Oct. 28, 2024

(65) Prior Publication Data

US 2026/0119456 A1 Apr. 30, 2026

(51) Int. Cl.
*G06F 16/00* (2019.01)
*G06F 16/16* (2019.01)
*G06F 16/174* (2019.01)

(52) U.S. Cl.
CPC ........ *G06F 16/1748* (2019.01); *G06F 16/162* (2019.01); *G06F 16/164* (2019.01)

(58) Field of Classification Search
USPC .......................................................... 707/822
See application file for complete search history.

(56) References Cited

U.S. PATENT DOCUMENTS 8,782,368 B2 7/2014 Lillibridge et al.
9,594,674 B1 * 3/2017 Mondal ............... G06F 16/1748
9,633,033 B2 4/2017 Vijayan et al.
9,672,218 B2 6/2017 Lillibridge et al.
10,296,490 B2 5/2019 Camble et al.
10,365,974 B2 7/2019 Todd et al.
10,496,490 B2 12/2019 Chandrasekharan et al.
10,592,347 B2 3/2020 Todd et al.
10,678,754 B1 * 6/2020 Colgrove .............. G06F 3/0608
10,884,643 B2 1/2021 Buratta et al.
11,494,115 B2 * 11/2022 Li ......................... G06F 3/0643
11,537,573 B2 * 12/2022 Ghanbari .............. G06F 16/215
(Continued)

FOREIGN PATENT DOCUMENTS

CN 113010104 A * 6/2021 ......... G06F 16/1748

OTHER PUBLICATIONS

Wikipedia, "Linked list," Jul. 1, 2024, <https://en.wikipedia.org/w/index.php?title=Linked_list&oldid=1232016513>, 14 pages.

*Primary Examiner* — Hasanul Mobin
(74) *Attorney, Agent, or Firm* — Trop, Pruner & Hu, P.C.

(57) ABSTRACT

Example implementations relate to deduplication operations in a storage system. An example includes receiving a data stream to be stored in persistent storage of a deduplication storage system, where the data stream includes multiple locality portions that each include multiple data units. The example also includes identifying a new data unit to be indexed by a particular container index that is associated with a locality portion including the new data unit. The example also includes, in response to a determination that the count of matching entries in the particular container index has reached a maximum number of matching entries, converting a first matching entry into a first nonmatching entry in the particular container index, and storing metadata of the new data unit in a new matching entry of the particular container index.

19 Claims, 15 Drawing Sheets

(56) References Cited

U.S. PATENT DOCUMENTS

| | | | | |
|---|---|---|---|---|
| 2012/0030477 | A1* | 2/2012 | Lu | G06F 11/1453 707/769 |
| 2015/0280736 | A1* | 10/2015 | Ogasawara | H03M 7/42 341/51 |
| 2016/0026652 | A1* | 1/2016 | Zheng | G06F 16/137 707/692 |
| 2016/0170657 | A1 | 6/2016 | Suehr et al. | |
| 2018/0322062 | A1 | 11/2018 | Watkins et al. | |
| 2020/0320040 | A1* | 10/2020 | Butt | G06F 3/0608 |
| 2021/0034584 | A1* | 2/2021 | Dalmatov | G06F 16/215 |
| 2021/0109772 | A1 | 4/2021 | Jaloma et al. | |
| 2021/0133174 | A1* | 5/2021 | Goswami | G06F 16/2246 |
| 2021/0232500 | A1 | 7/2021 | Butt et al. | |
| 2021/0406237 | A1* | 12/2021 | Killamsetti | G06F 16/2246 |
| 2023/0237029 | A1* | 7/2023 | Tal | G06F 16/215 707/692 |
| 2024/0143755 | A1* | 5/2024 | Falkinder | G06F 21/561 |

* cited by examiner

Container Index 160

| Matching Entries 200 | | | | |
|---|---|---|---|---|
| ID | Fingerprint | Ref. Count | Location | Time |
| -- | -- | -- | -- | -- |
| -- | -- | -- | -- | -- |
| -- | -- | -- | -- | -- |
| -- | -- | -- | -- | -- |

| Nonmatching Entries 210 | | | |
|---|---|---|---|
| ID | Fingerprint | Location | Time |
| -- | -- | -- | -- |
| -- | -- | -- | -- |
| -- | -- | -- | -- |
| -- | -- | -- | -- |

FIG. 2

Container Index 160

| Matching Entries 200 | | | | |
|---|---|---|---|---|
| ID | Fingerprint | Ref. Count | Location | Time |
| A | FGx | 7 | Lx | 0024 |
| B | FGy | 3 | Ly | 0008 |
| C | FGz | 6 | Lz | 0014 |
| D | FGm | 2 | Lm | 0021 |
| E | FGn | 2 | Ln | 0021 |

| Nonmatching Entries 210 | | | |
|---|---|---|---|
| ID | Ref. Count | Location | Time |
| | | | |
| | | | |
| | | | |

| Matching Entries 200 | | | | |
|---|---|---|---|---|
| ID | Fingerprint | Ref. Count | Location | Time |
| A | FGx | 12 | Lx | 0045 |
| D | FGm | 7 | Lm | 0042 |
| E | FGn | 7 | Ln | 0042 |
| F | FGy | 5 | Ly | 0038 |
| | | | | |

| Nonmatching Entries 210 | | | |
|---|---|---|---|
| ID | Ref. Count | Location | Time |
| B | 3 | Ly | 0008 |
| C | 6 | Lz | 0014 |
| | | | |

MANAGING CONTAINER INDEXES OF A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIG. 2 is an illustration of an example container index, in accordance with some implementations.

Figure 1:
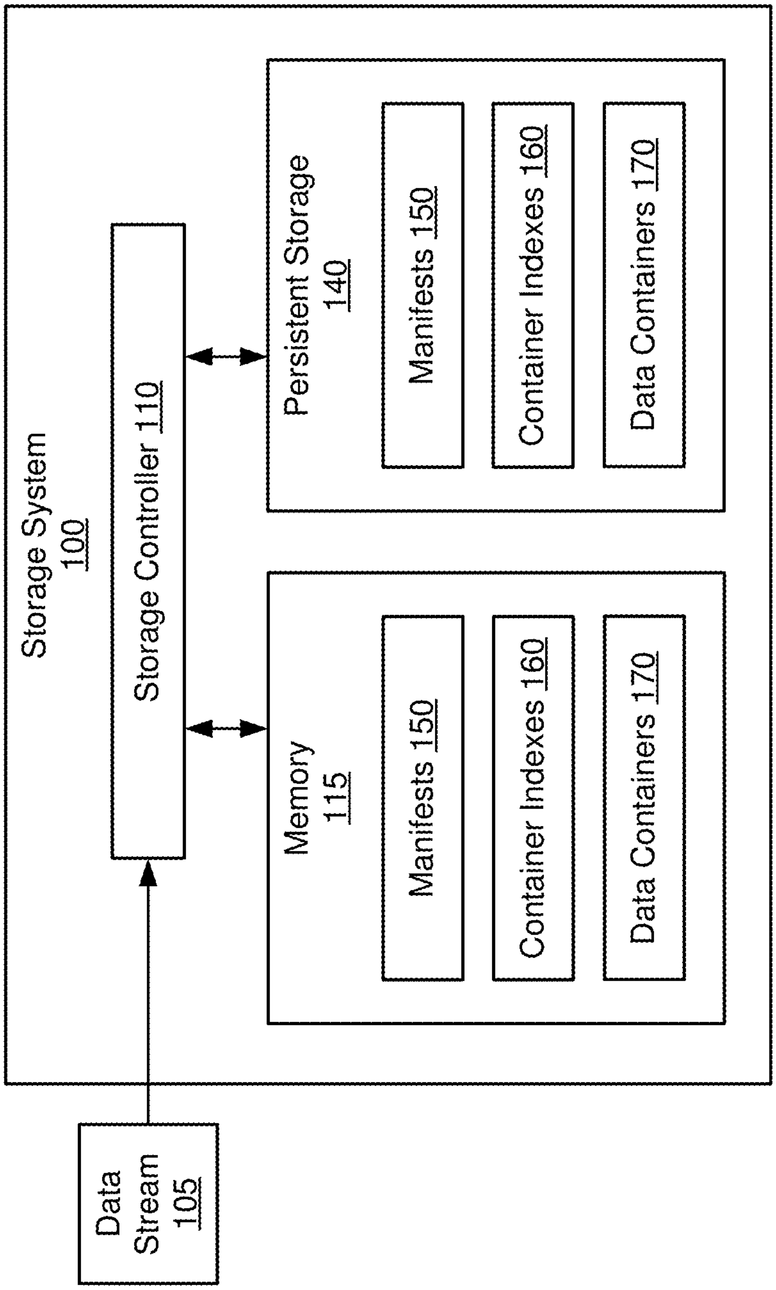
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream"). Further, in some examples, the storage system may backup at least a portion of the data stream in deduplicated form, to thereby reduce the amount of storage space occupied by storage of the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a storage system may use metadata structures for processing inbound data streams (e.g., backup items). For example, such metadata structures may include data recipes (also referred to herein as "manifests") that specify the order in which particular data units are received for each backup item. Further, such metadata structures may include item metadata to represent each received backup item (e.g., a data stream) in a deduplicated form. The item metadata may include identifiers for a set of manifests, and may indicate the sequential order of the set of manifests. The processing of each backup item may be referred to herein as a "backup process." Subsequently, in response to a read request, the storage system may use the item metadata and the set of manifests to determine the received order of data units, and may thereby recreate the original data stream of the backup item. Accordingly, the set of manifests may be a representation of the original backup item. The manifests may include a sequence of records, with each record representing a particular set of data unit(s). The records of the manifest may include one or more fields that identify container indexes. The container indexes may be metadata structures that index (e.g., include storage information for) the data units. For example, a container index may include multiple entries, and each entry may include one or more metadata fields that specify location information (e.g., data containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical chunk is already stored in a container of the storage system. For example, the storage system may compare the fingerprint of the received data unit against the fingerprints in one or more container indexes. As used herein, the term "matching operation" may refer to an operation to compare fingerprints of a collection of multiple data units (e.g., from a particular backup data stream) against fingerprints stored in one or more container indexes. If no matching fingerprints are found in the searched container index(es), the received data unit may be added to a data container, and a metadata entry for the received data unit may be added to a container index corresponding to that container. However, if a matching fingerprint is found in a searched container index, it may be determined that a data unit identical to the received data unit is already stored in an existing data container. In response to this determination, the reference count of the corresponding entry may be incremented, and the received data unit is not stored in a data container (as it is already present in one of the data containers), thereby avoiding storing a duplicate data unit in the storage system.

In some examples, when processing an initial instance of a data stream (e.g., during the initial backup of a given backup item), a set of initial container indexes may be allocated to different localities (e.g., portions or segments) in the stream. Each initial container index may record metadata for the data units included in the locality portion that is associated with that initial container index. As used herein, the term "data localization" may refer to storing data and/or metadata for a given locality (also referred to herein as a "locality portion") in a single data object (or a set of associated data objects). Such data localization may allow the storage system to perform deduplication in a relatively efficient manner (e.g., in comparison to not using data localization). For example, when receiving a set of data units in a particular locality portion of the stream, the storage system may perform deduplication of that set of data units by retrieving and reading a single container index that is associated with that locality portion. Accordingly, use of data localization may reduce the amount of metadata that has to be retrieved from storage and loaded into memory, and may thereby improve the performance of the storage system.

In some examples, when processing the initial instance of the data stream, each initial container index may only be partially filled with metadata (e.g., to allow for future addition of new data units). Subsequently, when processing later instances of the data stream (e.g., for subsequent backups of the same backup item), the metadata for new data units that match a particular locality portion may be stored in the initial (partially-filled) container index that is allocated to that particular locality portion. Further, if a later instance of the data stream includes a new data unit that does not match any of the locality portions associated with the set of initial container indexes, the metadata for that new data unit may be stored in a new container index (referred to as a "sticky container index") that has available storage capacity and is associated with a new locality portion that is added to the data stream. Once the sticky container index is filled, another (new) sticky container index may be instantiated. Further, this new sticky container index may be associated with another (new) locality portion that is added to the data stream.

In some examples, once an initial container index is filled to a maximum level or threshold (i.e., when processing later instances of the data stream), that initial container index lacks the capacity to store any additional metadata for new data units in the locality portion associated with that initial container index. In such examples, the metadata for the new data unit may be stored in the sticky container index. Further, this process may be repeated for new data units in different locality portions, thereby causing the sticky container index to store metadata for data units in multiple locality portions. Therefore, in such examples, the sticky container index(es) may fail to provide data localization, and may thus result in relatively lower performance and/or higher financial costs to perform deduplication. For example, when receiving data units that are included in a particular locality portion, but those data units were previously indexed across multiple sticky container indexes associated with different locality portions, the storage system may have to identify and read these multiple sticky container indexes to perform deduplication of those data units. In particular, each sticky container index may have to be separately retrieved from storage and transferred across a network. However, each sticky container index may only include a relatively small portion of the metadata that is actually used for the deduplication operation. Accordingly, in such examples, the need to use multiple sticky container indexes (for different locality portions) may result in a relatively large amount of metadata that has to be retrieved from storage and loaded into memory to perform the deduplication operation (e.g., in comparison to using a smaller number of container indexes that provide data localization), and may thereby reduce the performance and/or increase the financial costs associated with deduplication.

In accordance with some implementations of the present disclosure, a controller of a deduplication storage system may manage a set of container indexes that are associated with different locality portions in a received data stream. Each container index may include both matching entries and nonmatching entries, where the number of matching entries is limited to a first maximum value (referred to as a "maximum matching limit"), and where the number of nonmatching entries is limited to a second maximum value (referred to as a "maximum nonmatching limit").

In some implementations, each matching entry may include a fingerprint for a stored data unit, and may be used to perform matching operations for received data units. If a new matching entry is needed in a container index that has reached its maximum matching limit, the controller may convert an existing matching entry into a nonmatching entry of the container index, and may then add the new matching entry to the container index. In some implementations, the existing matching entry that is converted may be the least recently used matching entry (i.e., the matching entry that was least recently matched during a matching operation). Further, if any matching entry becomes "stale" (i.e., the time since the last match for the matching entry exceeds a maximum time limit), that matching entry may also be converted to a nonmatching entry of the container index.

In some implementations, each nonmatching entry may not include a fingerprint, and may not be used for matching operations. As such, the nonmatching entry for a data unit may be maintained in a container index (e.g., to track the reference count for the data unit), while requiring less storage space than a matching entry for the data unit.

Further, if the number of nonmatching entries in the container index reaches the maximum nonmatching limit, the controller may delete a nonmatching entry from the container index. In this manner, the container index may be updated as needed to store metadata for the most recently received data units in the associated locality portion. Accordingly, the container index may provide data localization of metadata used to perform data deduplication, thereby reducing the performance impacts and/or financial costs associated with deduplication. For example, when receiving a set of data units in a particular locality portion of the stream, the storage system may perform deduplication of that set of data units by retrieving and reading a single container index associated with that locality portion. Therefore, the disclosed technique for managing container indexes may reduce the amount of metadata that has to be retrieved from storage and loaded into memory (i.e., in contrast to retrieving and loading a relatively large number of sticky container indexes associated with different locality portions). The disclosed technique for managing container indexes is discussed further below with reference to FIGS. 1-9.

FIGS. 1-2—Example Storage System

FIG. 1 shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the memory 115 and the persistent storage 140 may store various data structures including at least manifests 150, container indexes 160, and data containers 170. In some examples, copies of the manifests 150, the container indexes 160, and the data containers 170 may be transferred between the memory 115 and the persistent storage 140 (e.g., via read and write input/output (I/O) operations).

In some implementations, the storage system 100 may perform a data ingest operation to deduplicate received data. For example, the storage controller 110 may receive an inbound data stream 105 including multiple data units, and may store at least one copy of each data unit in a data container 170 (e.g., by appending the data units to the end of the data container 170). Further, the data stream 105 may be divided into different localities (e.g., portions or segments) in the stream. In some examples, each instance of a received data stream 105 may represent a unique backup of a collection of data. Further, in some examples, an inbound stream may be deduplicated and stored as a backup item.

In some implementations, the storage controller 110 may generate a fingerprint for each received data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints in at least one container index 160. The process of comparing fingerprints of one or more received data units against fingerprints of one or more container indexes 160 may be referred to herein as a "matching operation." If a match is identified in a matching operation, the storage controller 110 may determine that a duplicate of the incoming data unit is already stored by the storage system 100. The storage controller 110 may then store references to the previous data unit, instead of storing the duplicate incoming data unit. Otherwise, if no match is identified in the matching operation, the storage controller 110 may determine that the incoming data unit is a new data unit (i.e., is not already stored by the storage system 100). The storage controller 110 may then store a copy of the new data unit in a data container 170, and may index the new data unit in a container index 160.

In some implementations, the manifests 150 may include a pointer or other information indicating the container index 160 that indexes each data unit. In some implementations, the container index 160 may include a fingerprint (e.g., a hash) of a stored data unit for use in a matching process of a deduplication process. Further, the container index 160 may indicate the location in which the data unit is stored. For example, the container index 160 may include information specifying that the data unit is stored at a particular offset in an entity, and that the entity is stored at a particular offset in a data container 170. The container index 160 may also include reference counts that indicate the number of manifests 150 that reference each data unit. In some implementations, a container index 160 may record metadata for data units included in the locality portion (in data stream 105) that is allocated or associated to that container index 160.

In some implementations, prior to attempting to perform matching operations for received data units, the storage controller 110 may identify a particular container index 160 (referred to herein as the "candidate" container index) to use in matching operations for received data unit(s). In some examples, the candidate container index may be identified using a data structure (referred to herein as a "sparse index") that maps a relatively small subset of fingerprints (referred to herein as "hook points") to corresponding container indexes 160. For example, the hook points of incoming data units may be compared to the hook points in the sparse index, and the container index 160 with the highest number of matching hook points may be identified as the candidate container index. Alternatively, in some implementations, the sparse index may be used to identify a "candidate list" including multiple container indexes 160 (e.g., five container indexes 160) that have the highest numbers of matching hook points. In such implementations, the candidate list may be used in matching operations for received data unit(s). In some implementations, the sparse index may contain entries for a subset of fingerprints defined by a sparse fingerprint condition. As used herein, the term "hook points" refers to the subset of fingerprints that meet the sparse fingerprint condition. In some examples, the sparse fingerprint condition may be a condition that is met by a relatively small number of all of the possible fingerprints. For example, the sparse fingerprint condition may be whether a given fingerprint (e.g., in a binary representation) includes a particular bit pattern at a particular offset.

In some implementations, the storage controller 110 may receive a read request to access the stored data, and in response may access metadata (e.g., one or more manifests 150) to determine the sequence of data units that made up the original data. The storage controller 110 may then use pointer data included in a manifest 150 to identify the container indexes 160 that index the data units. Further, the storage controller 110 may use information included in the identified container indexes 160 (and information included in the manifest 150) to determine the locations that store the data units (e.g., data container 170, entity, offsets, etc.), and may then read the data units from the determined locations.

FIG. 2 shows an example container index 160 including multiple entries, where each entry records metadata for (i.e., indexes) different data units stored in deduplicated form (e.g., in data containers 170). In some implementations, the entries of the container index 160 may be divided into matching entries 200 and nonmatching entries 210. The total count of matching entries 200 in the container index 160 may be limited to a maximum number (i.e., a maximum matching limit). Further, the total count of nonmatching entries in the container index 160 may be limited to a second maximum number (i.e., a maximum nonmatching limit).

In some implementations, each matching entry 200 may include various metadata fields, such as a fingerprint (e.g., a hash of the data unit), a reference count, a location, and a time value. Further, each nonmatching entry 210 may exclude the fingerprint, but may include the reference count, the location, and the time value. The reference count value may indicate the number of manifests 150 (or manifest records) that reference the indexed data unit. The location value may indicate an address where the indexed data unit is stored (e.g., in a data container 170). Note that, while FIG. 2 shows example implementations of the matching entries 200 and the nonmatching entries 210, other implementations are possible. For example, it is contemplated that the matching entries 200 and/or the nonmatching entries 210 may include additional fields, fewer fields, different fields, and so forth.

In some implementations, the time value of an entry may indicate (or be usable to determine) the time duration since that entry was most recently matched in matching operations of the storage system 100. For example, the time value may be a time stamp (e.g., data/time) for the last successful match of the fingerprint in the entry. In other examples, the time value may be a numeric identifier (e.g., an integer value that is incremented by one for each successive backup operation) for the last backup operation that included a successful match of the fingerprint in the entry, and that thereby indicates the relative age of the identified backup operation with respect to other backup operations.

In some implementations, upon receiving a new data unit, the storage controller 110 may identify the container index 160 that is associated with the locality portion that includes the new data unit. The storage controller 110 may determine whether the identified container index 160 has reached its maximum matching limit (i.e., already includes the maximum number of matching entries 200), and therefore has no available capacity to store an additional matching entry 200 for the new data unit. If the identified container index 160 has reached its maximum matching limit, the storage controller 110 may convert an existing matching entry 200 into a nonmatching entry 210. The storage controller 110 may then create a new matching entry 200 for the new data unit. In some implementations, the existing matching entry 200 that is converted may be the least recently used matching entry 200 (i.e., the matching entry 200 that was least recently matched during a matching operation). Further, upon determining that a matching entry 200 has become stale (i.e., the time duration since the last match for the matching entry 200 exceeds a maximum age limit), the storage controller 110 may convert that matching entry 200 into a nonmatching entry 210. Example processes for updating container index entries are discussed further below with reference to FIGS. 3A-5. In some implementations, the maximum matching limit, the maximum nonmatching limit, and/or the maximum age limit may be settings or parameters implemented in the storage system 100 (e.g., a user setting, an application parameter, a client specification, and so forth).

FIGS. 3A-4F—Example Process for Updating Container Index Entries

Figure 3A:
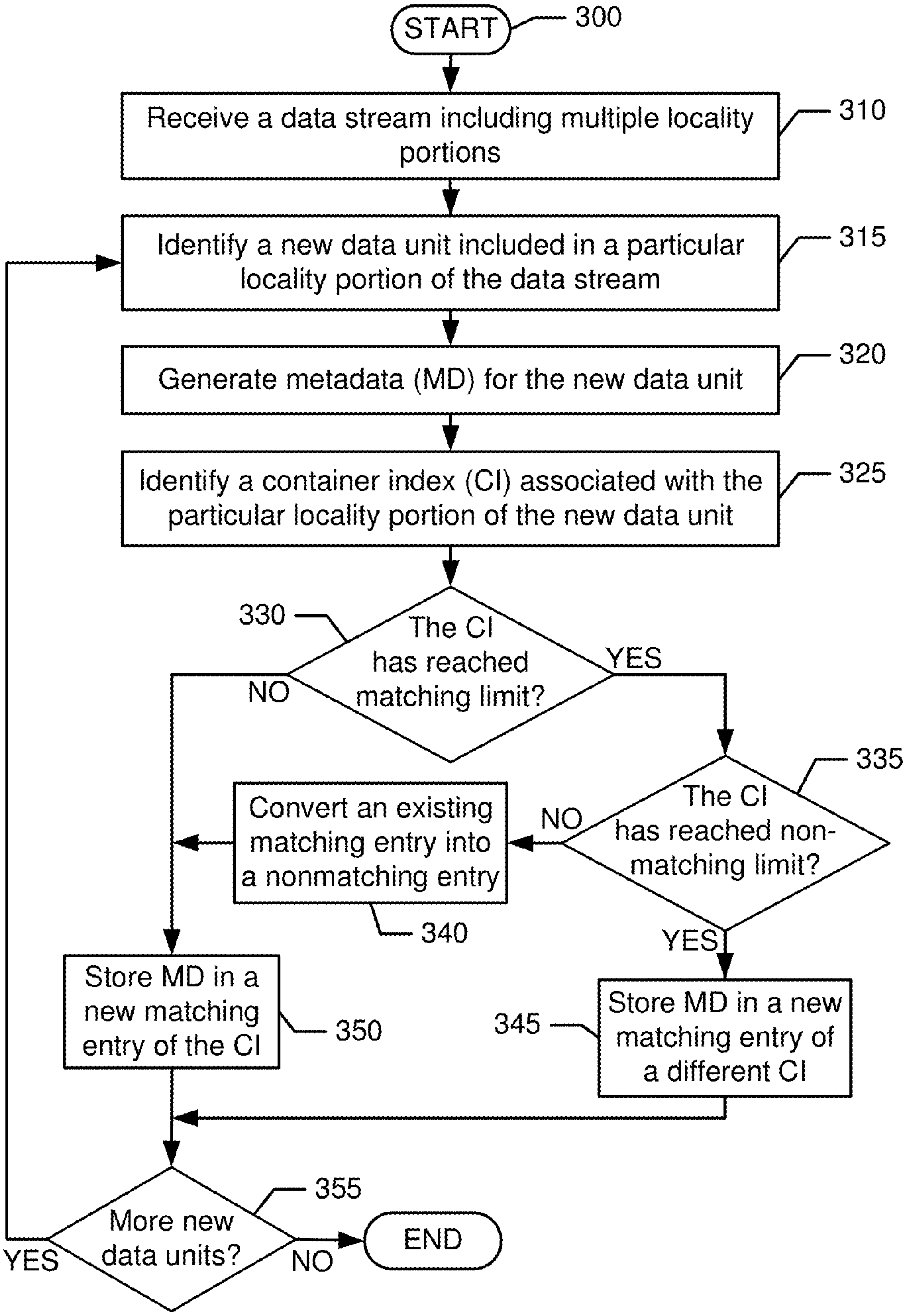
FIGS. 3A-3B are illustrations of example processes, in accordance with some implementations.
Figure 3B:
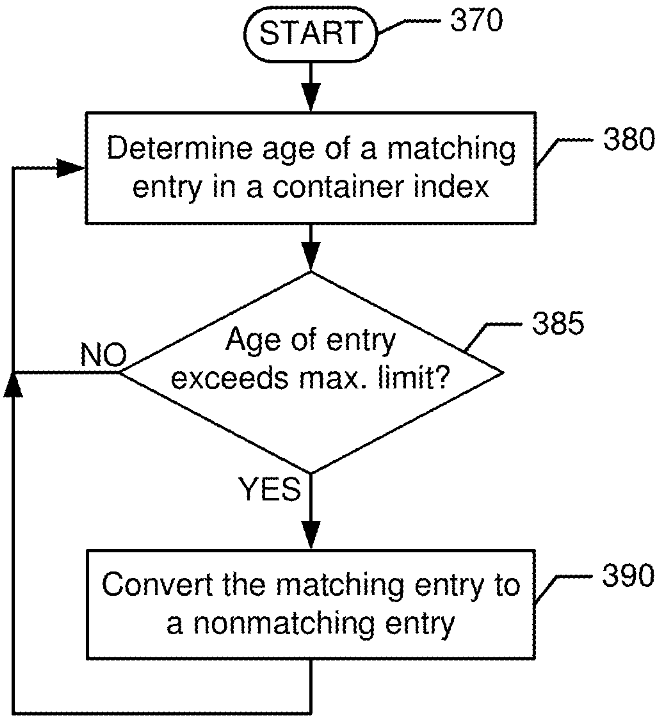

FIGS. 3A-3B show example processes 300, 370 for updating container index entries, in accordance with some implementations. For the sake of illustration, details of the processes 300, 370 may be described below with reference to FIGS. 4A-4F, which show examples in accordance with some implementations. However, other implementations are also possible. In some examples, the processes 300, 370 may be performed using the storage controller 110 (shown in FIG. 1). The processes 300, 370 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Referring to FIG. 3A, shown is a process 300 for converting matching entries based on a maximum matching limit. Block 310 may include receiving a data stream including multiple locality portions. Block 315 may include identifying a new data unit included in a particular locality portion of the data stream. Block 320 may include generating metadata (MD) for the new data unit included in the data stream. Block 325 may include identifying a container index (CI) associated with the particular locality portion of the new data unit. Decision block 330 may include determining whether a number of matching entries in the identified container index has reached a maximum matching limit (i.e., already includes the maximum number of matching entries that can be stored in a container index).

If it is determined at decision block 330 that the number of matching entries in the identified container index has reached the maximum matching limit ("YES"), the process 300 may continue at decision block 335, including determining whether a number of nonmatching entries in the identified container index has reached a maximum nonmatching limit. Upon a positive determination at block 335 ("YES"), the process 300 may continue at block 345, including storing the metadata in a new matching entry of a different container index (e.g., a "sticky container index" that has available storage capacity and is associated with a new locality portion that is added to the data stream). Otherwise, if it is determined at decision block 335 that the number of nonmatching entries in the identified container index has not reached the maximum nonmatching limit ("NO"), the process 300 may continue at block 340, including converting an existing matching entry into a nonmatching entry, thereby reducing the number of matching entries in the identified container index below the maximum matching limit.

After block 340, or if it is determined at decision block 330 that the number of matching entries in the identified container index has not reached the maximum matching limit ("NO"), the process 300 may continue at block 350, including storing the metadata in a new matching entry of the identified container index.

After block 350 or block 345, the process 300 may continue at decision block 355, including determining whether there are more new data units remaining to be processed in the data stream. If so ("YES"), the process 300 may return to block 315 (i.e., to identify and process another new data unit included in the data stream). Otherwise, if it is determined at decision block 355 that there are no more new data units remaining to be processed in the data stream ("NO"), the process 300 may be completed.

Figure 4A:
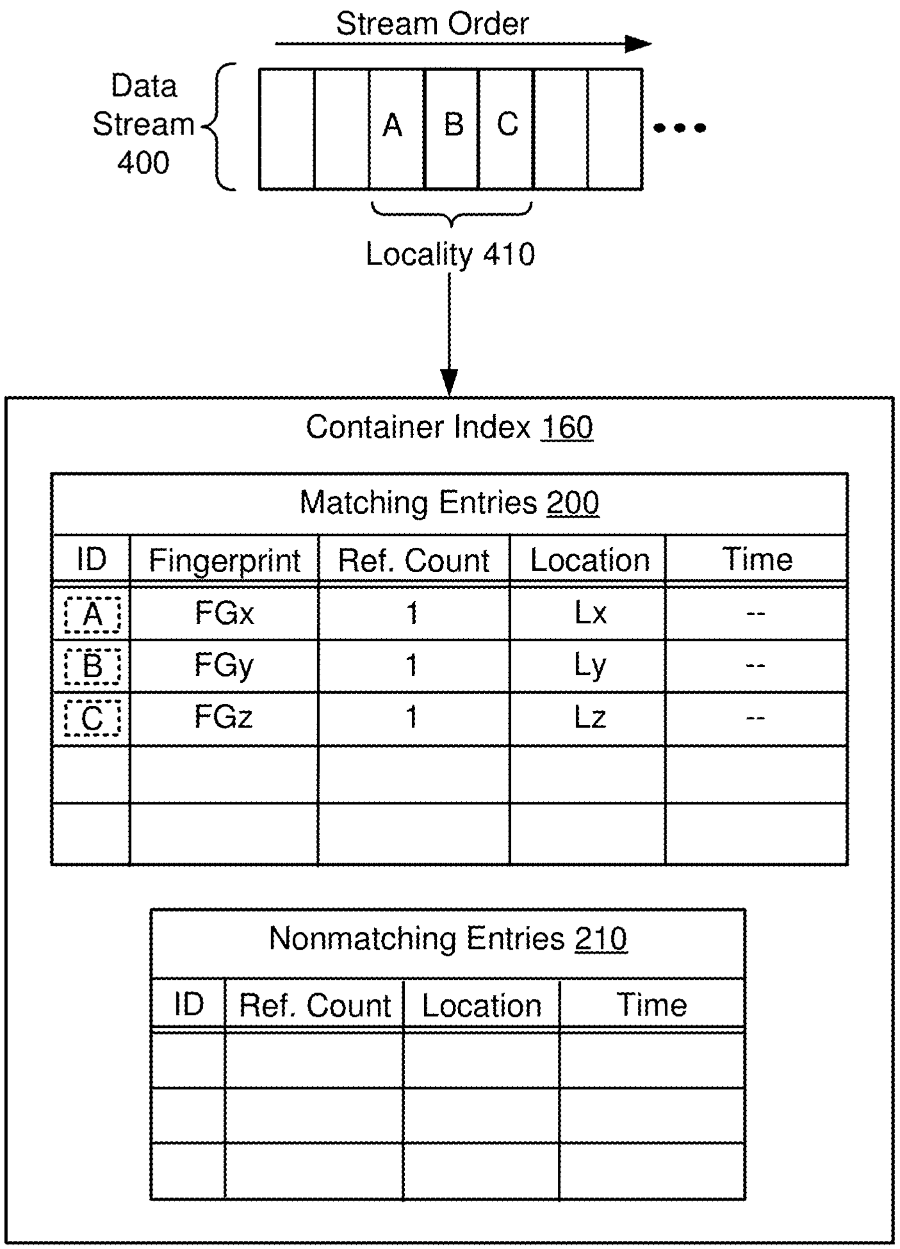
FIGS. 4A-4F are illustrations of example operations, in accordance with some implementations.

For example, referring to FIG. 4A, at a first point in time, a controller (e.g., storage controller 110 shown in FIG. 1) receives a data stream 400 to be stored in persistent storage. The data stream 400 may be one of multiple instances of a backup data stream that are received at different points in time (e.g., during multiple backup operations of a collection of data). The data stream 400 may include multiple data units that are divided into multiple locality portions. Each locality portion may be associated with a different container index that records metadata for the data units in that locality portion.

In the example shown in FIG. 4A, the container index 160 is associated with a locality portion 410 of the data stream 400. Further, in this example, the container index 160 can store up to five matching entries 200 (i.e., the maximum matching limit), and can also store up to three nonmatching entries 210 (i.e., the maximum nonmatching limit). The controller determines that the locality portion 410 includes three new data units ("A," "B," and "C") that are not already stored by the storage system 100 (or are not indexed in a container index). Furthermore, the controller determines that the number of matching entries 200 currently stored in the container index 160 (i.e., zero) has not reached the maximum matching limit of five. Accordingly, the controller initializes and/or populates three new matching entries 200 to record metadata (e.g., fingerprint, reference count, storage location, and time value) for the three new data units ("A," "B," and "C"). In some implementations, the time value recorded for a matching entry 200 may indicate the time period that has elapsed since that matching entry 200 was most recently matched in a matching operation. For example, the time value may be a time stamp for the last successful match of the fingerprint in the matching entry 200, an identifier for the last backup operation that included a successful match of the fingerprint in the entry, and so forth.

In some implementations, the controller may determine that the container index 160 is associated with the locality portion 410 based on a sparse index. For example, the controller may compare hook points of data units in the locality portion 410 to hook points in a sparse index, and may thereby identify the associated container index 160 (from among multiple container indexes) as having the highest number of hook points that match the hook points in the data units of the locality portion 410. In some examples, the controller may then determine that the new data units ("A," "B," and "C") are located the locality portion 410 (i.e., the locality portion associated with the container index 160).

Figure 4B:
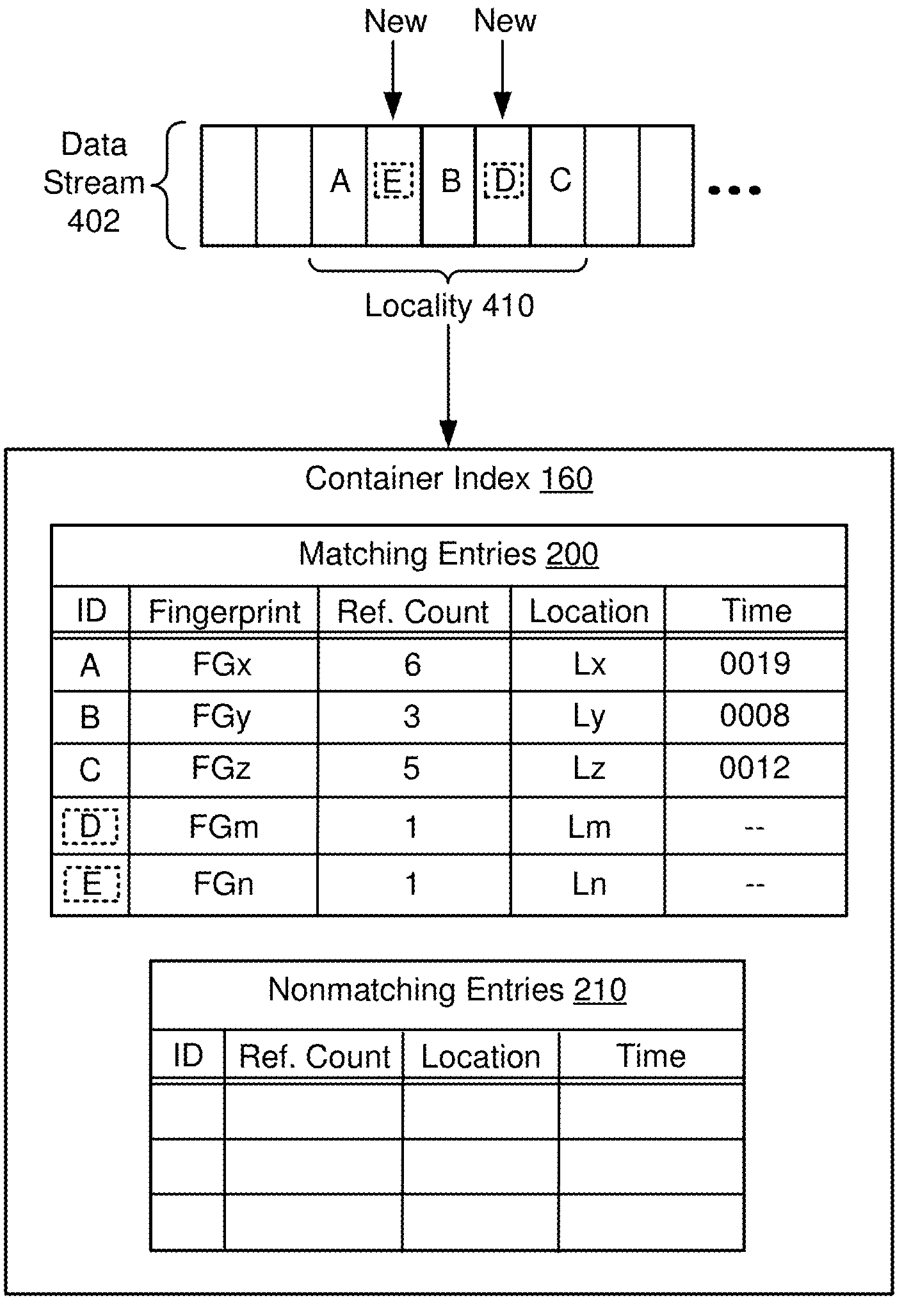

Referring now to FIG. 4B, at a second point in time, the controller receives a data stream 402 that is a later instance of the backup data stream (e.g., during a subsequent backup of the collection of data). The controller determines that, in the data stream 402, the locality portion 410 includes two new data units ("D" and "E"). Further, the controller determines that the number of matching entries 200 currently stored in the container index 160 (i.e., three) has not reached the maximum matching limit of five. Accordingly, the controller initializes and/or populates two new matching entries 200 to record metadata for the two new data units ("D" and "E").

Figure 4C:
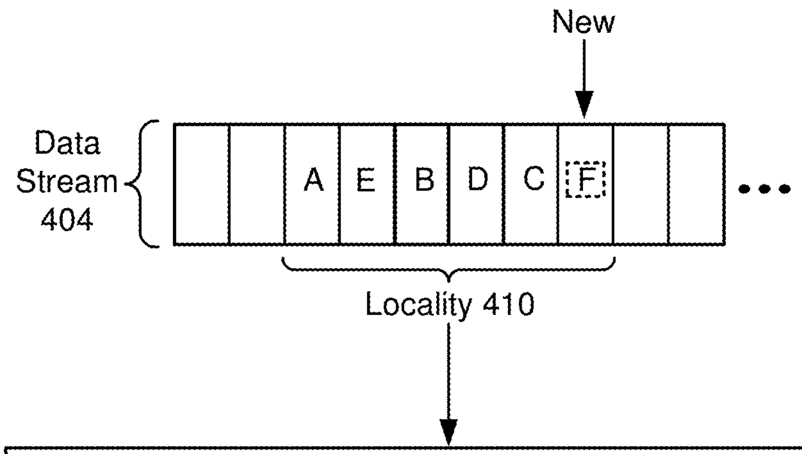

Referring now to FIG. 4C, at a third point in time, the controller receives a data stream 404 that is a later instance of the backup data stream. The controller determines that, in the data stream 404, the locality portion 410 includes one new data unit ("F"). Further, the controller determines that the number of matching entries 200 currently stored in the container index 160 (i.e., five) has reached the maximum matching limit of five, and therefore the container index 160 currently lacks available capacity to store an additional matching entry 200 (i.e., to store metadata for new data unit "F"). In response to this determination, the controller may select an existing matching entry 200 to be converted into a nonmatching entry 210.

Figure 4D:
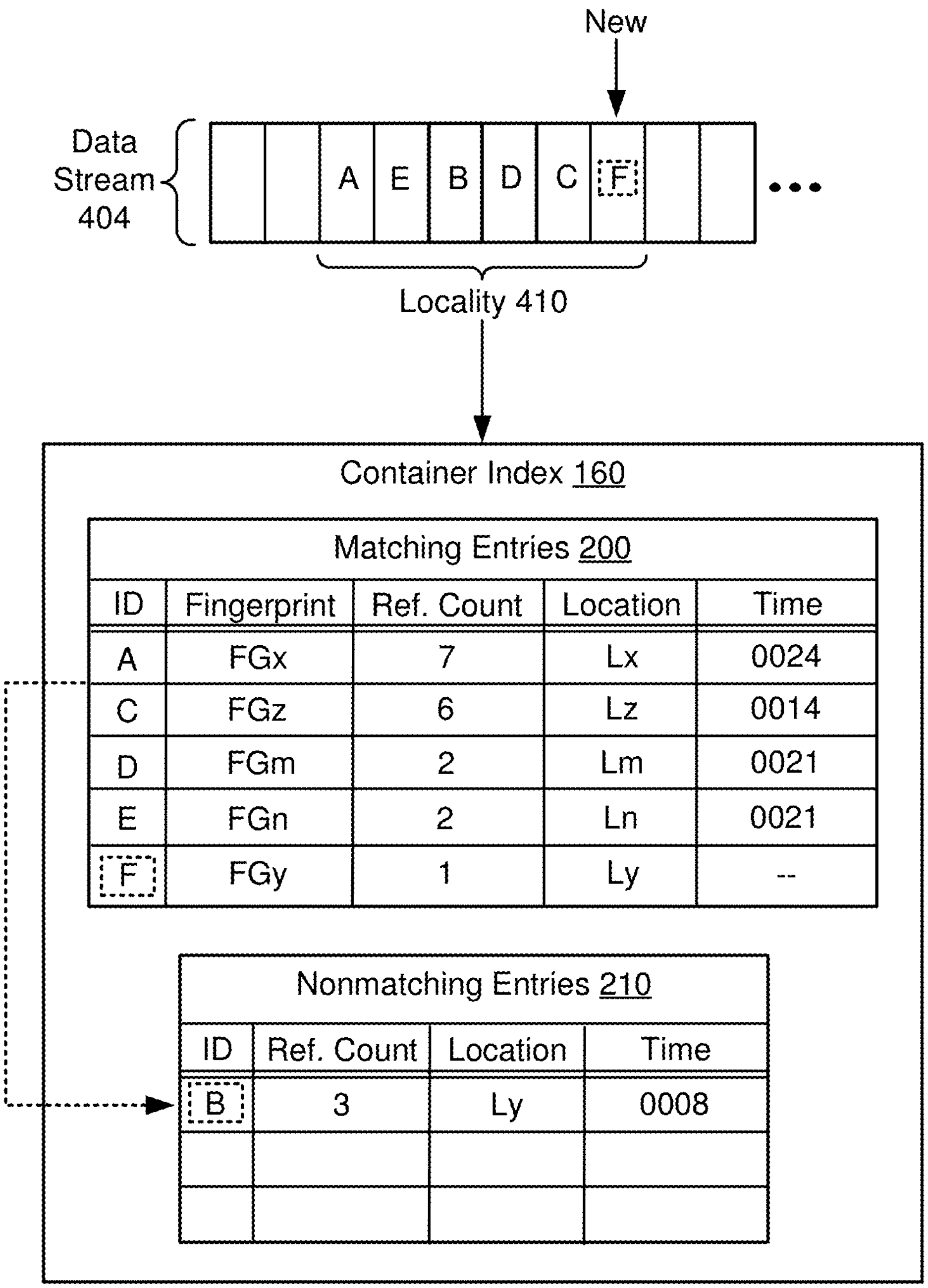

In some implementations, the existing matching entry 200 that is selected for conversion may be the least recently used matching entry 200 (i.e., the matching entry 200 that was least recently matched during a matching operation). In the example shown in FIG. 4C, the matching entry 200 for the data unit "B" has the smallest (i.e., oldest) time value ("0008"), and therefore is the least recently used matching entry 200 included in the container index 160. Accordingly, as shown in FIG. 4D, the controller converts the matching entry 200 for the data unit "B" into a new nonmatching entry 210, thereby reducing the number of matching entries 200 below the maximum matching limit (i.e., five). The controller then initializes and/or populates a new matching entry 200 to record metadata for the new data unit ("F"). In some implementations, the new nonmatching entry 210 for data unit "B" may include at least some of the metadata stored in the converted matching entry 200, but may exclude the fingerprint for the data unit "B."

Referring now to FIG. 3B, shown is a process 370 for converting matching entries based on entry age. Block 380 may include determining an age value of a matching entry in a container index. Decision block 385 may include determining whether the age of the matching entry exceeds a maximum age limit (e.g., a setting or parameter to limit the maximum age for matching entries). Upon a positive determination ("YES"), the process 370 may continue at block 390, including converting the matching entry into a nonmatching entry. After block 390, or if it is determined at decision block 385 that the age of the matching entry does not exceed the maximum age limit ("NO"), the process 370 may return to block 380 (i.e., to continue evaluating and processing matching entries of the container index).

Figure 4E:
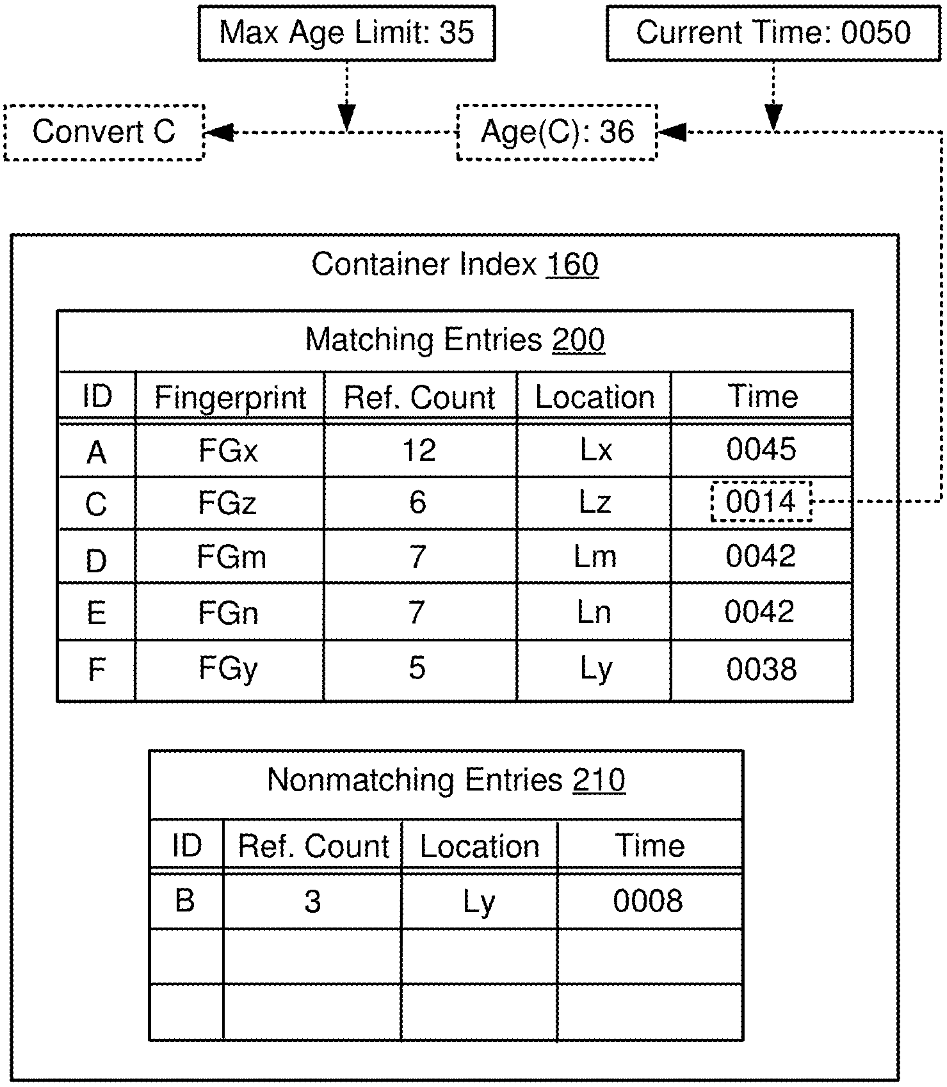
Figure 4F:
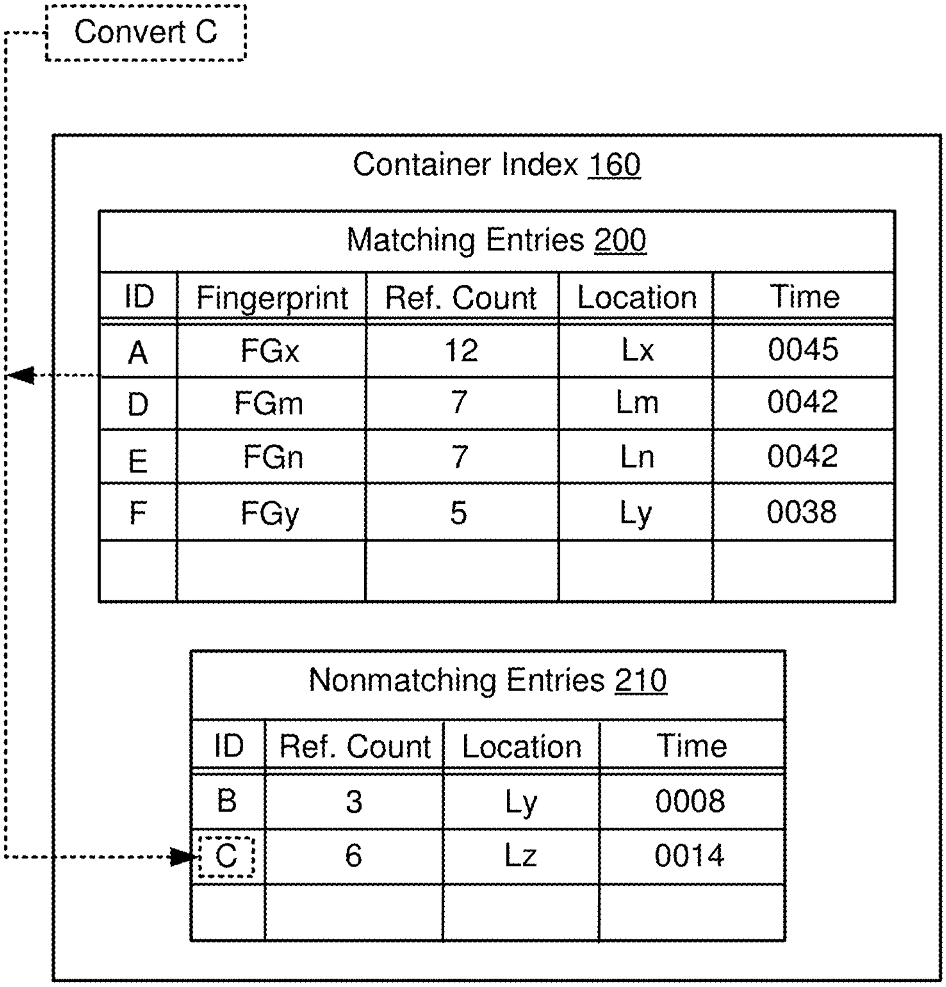

For example, referring to FIG. 4E, the controller calculates an age value for each matching entry 200. The age value may indicate the time period that has elapsed since that matching entry 200 was most recently matched in a matching operation. As shown in FIG. 4E, the controller subtracts the time value ("14") in the matching entry 200 for the data unit "C" from the current time ("50"), and thereby calculates an age value ("36") associated with the data unit "C." Further, the controller determines that the calculated age value ("36") exceeds a maximum age limit. Accordingly, as shown in FIG. 4F, the controller converts the matching entry 200 for the data unit "C" into a new nonmatching entry 210.

Figure 5:
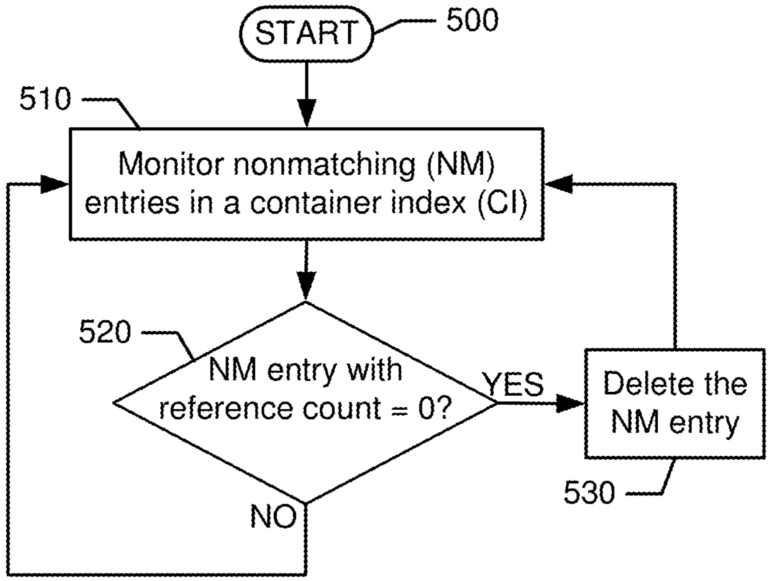
FIG. 5 is an illustration of an example process, in accordance with some implementations.

FIG. 5—Example Process for Managing Nonmatching Entries

FIG. 5 illustrates an example process 500 for managing nonmatching entries in a container index. For the sake of illustration, details of the process 500 may be described below with reference to FIGS. 1-2, which show examples in accordance with some implementations. However, other implementations are also possible. In some examples, the process 500 may be performed using the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 510 may include monitoring a set of nonmatching (NM) entries in a container index (CI). Decision block 520 may include determining whether any nonmatching entry includes a reference count equal to (or less than) zero. Upon a positive determination ("YES"), the process 500 may continue at block 530, including deleting the nonmatching entry (with the reference count equal to zero) from the container index. After block 530, or if it is determined at decision block 520 that there is no nonmatching entry that includes a reference count equal to zero ("NO"), the process 500 may return to block 510 (i.e., to continue monitoring and processing nonmatching entries of the container index).

For example, referring to FIGS. 1-2, the storage controller 110 determines that a particular nonmatching entry 210 includes a reference count equal to zero, thereby indicating that the indexed data unit (represented by the particular nonmatching entry 210) is no longer referenced by any manifests 150. In response to this determination, the storage controller 110 deletes or otherwise removes that particular nonmatching entry 210 from the container index 160.

Figure 6:
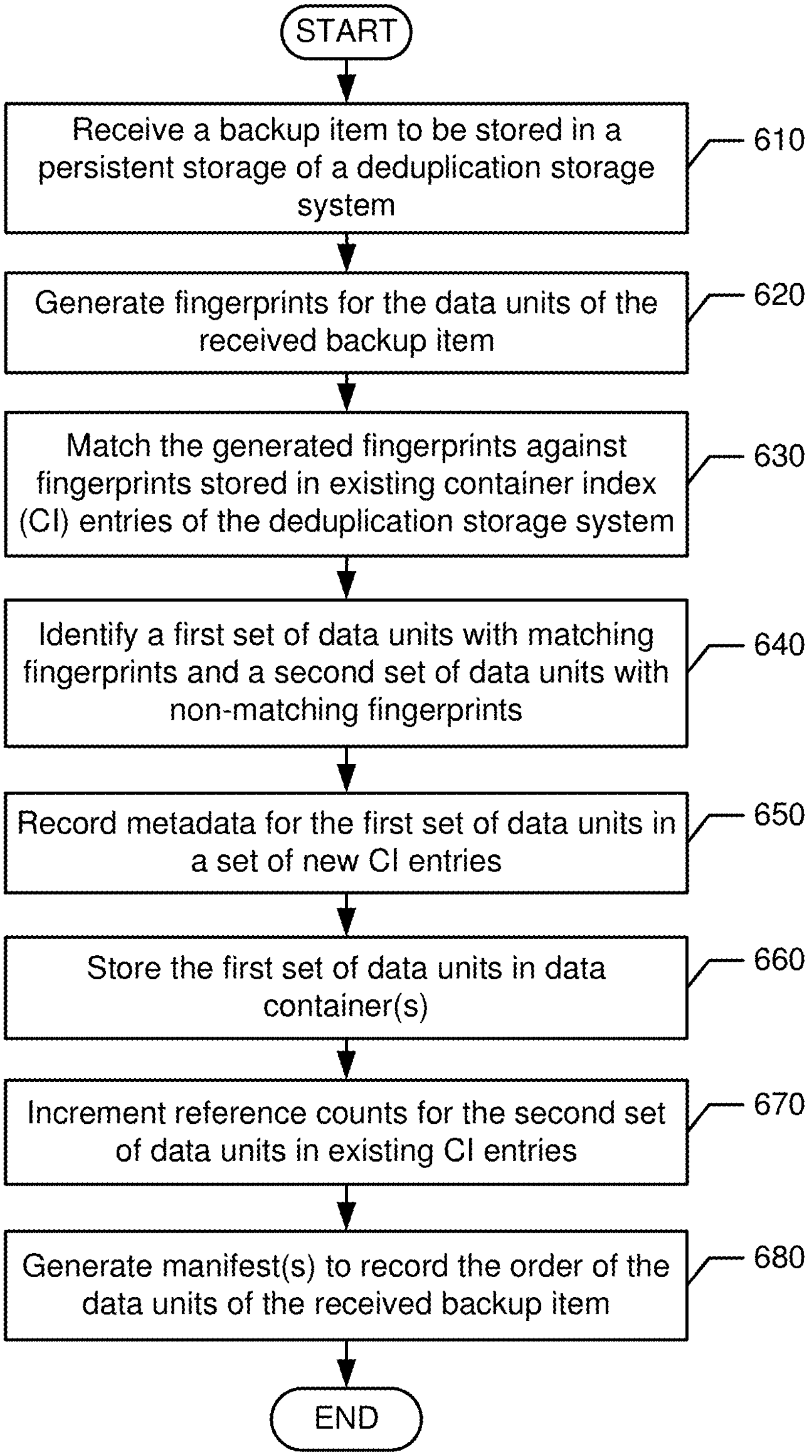
FIG. 6 is an illustration of an example process, in accordance with some implementations.

FIG. 6—Example Process for Generating Metadata

FIG. 6 shows an example process 600 for generating metadata, in accordance with some implementations. For the sake of illustration, details of the process 600 may be described below with reference to FIGS. 1-2, which show examples in accordance with some implementations. However, other implementations are also possible. In some examples, the process 600 may be performed using the storage controller 110 (shown in FIG. 1). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 610 may include receiving a backup item to be stored in a persistent storage of a deduplication storage system. Block 620 may include generating fingerprints for the data units of the received backup item. Block 630 may include matching the generated fingerprints against fingerprints stored in existing container index (CI) entries of the deduplication storage system. Block 640 may include identifying a first set of data units with matching fingerprints and a second set of data units with non-matching fingerprints.

Block 650 may include recording metadata for the first set of data units in a set of new CI entries. Block 660 may include storing the first set of data units in one or more data containers. Block 670 may include incrementing reference counts for the second set of data units in existing CI entries. Block 680 may include generating one or more manifests to record the order of the data units of the received backup item.

For example, referring to FIG. 1, the storage controller 110 receives a backup item (e.g., data stream 105) to be stored in the deduplication storage system 100, and generates fingerprints for the data units in the received backup item. The storage controller 110 compares the generated fingerprints to the fingerprints included in container indexes 160. If a match is identified for a data unit, then the storage controller 110 determines that a duplicate of the data unit is already stored by the storage system 100. In response to this determination, the storage controller 110 stores a reference to the previous data unit (e.g., in a manifest 150) in deduplicated form. Otherwise, if a match is not identified for a data unit, then the storage controller 110 stores the data unit in a data container 170, and adds an entry for the data unit to a container index 160 corresponding to that data container 170. In some implementations, the storage controller 110 records the order in which data units are received in one or more manifests 150.

Figure 7:
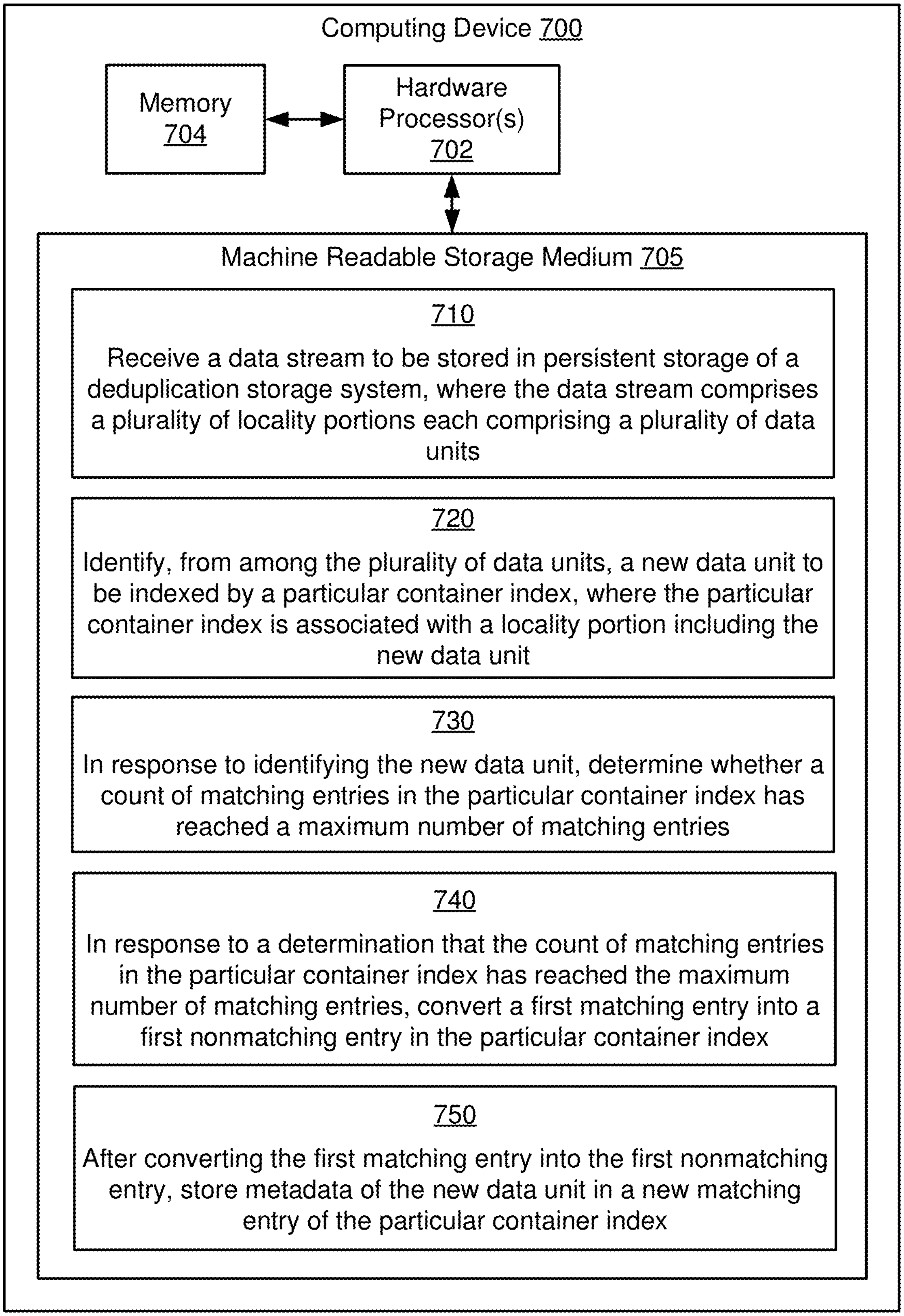
FIG. 7 is a schematic diagram of an example computing device, in accordance with some implementations.

FIG. 7—Example Computing Device

FIG. 7 shows a schematic diagram of an example computing device 700. In some examples, the computing device 700 may correspond generally to some or all of the storage system 100 (shown in FIG. 1). As shown, the computing device 700 may include a hardware processor 702, a memory 704, and machine-readable storage 705 including instructions 710-750. The machine-readable storage 705 may be a non-transitory medium. The instructions 710-750 may be executed by the hardware processor 702, or by a processing engine included in hardware processor 702.

Instruction 710 may be executed to receive a data stream to be stored in persistent storage of a deduplication storage system, where the data stream comprises a plurality of locality portions each comprising a plurality of data units. Instruction 720 may be executed to identify, from among the plurality of data units, a new data unit to be indexed in a particular container index, where the particular container index is associated with a locality portion including the new data unit.

Instruction 730 may be executed to, in response to identifying the new data unit, determining whether a count of matching entries in the particular container index has reached a maximum number of matching entries. Instruction 740 may be executed to, in response to a determination that the count of matching entries in the particular container index has reached the maximum number of matching entries, convert a first matching entry into a first nonmatching entry in the particular container index. Instruction 750 may be executed to, after converting the first matching entry into the first nonmatching entry, store metadata of the new data unit in a new matching entry of the particular container index.

For example, referring to FIG. 4C, a controller (e.g., storage controller 110 shown in FIG. 1) receives a data stream 404 that includes a locality portion 410. The controller determines that the locality portion 410 includes one new data unit ("F"). Further, the controller determines that the number of matching entries 200 currently stored in the container index 160 (i.e., five) has reached the maximum matching limit of five, and therefore the container index 160 currently lacks available capacity to store an additional matching entry 200 for the new data unit "F." In response to this determination, the controller converts an existing matching entry 200 into a nonmatching entry 210. In some implementations, the existing matching entry 200 that is selected for conversion is the least recently used matching entry, namely the matching entry 200 for data unit "B." The controller then initializes and/or populates a new matching entry 200 to record metadata for the new data unit ("F").

Figure 8:
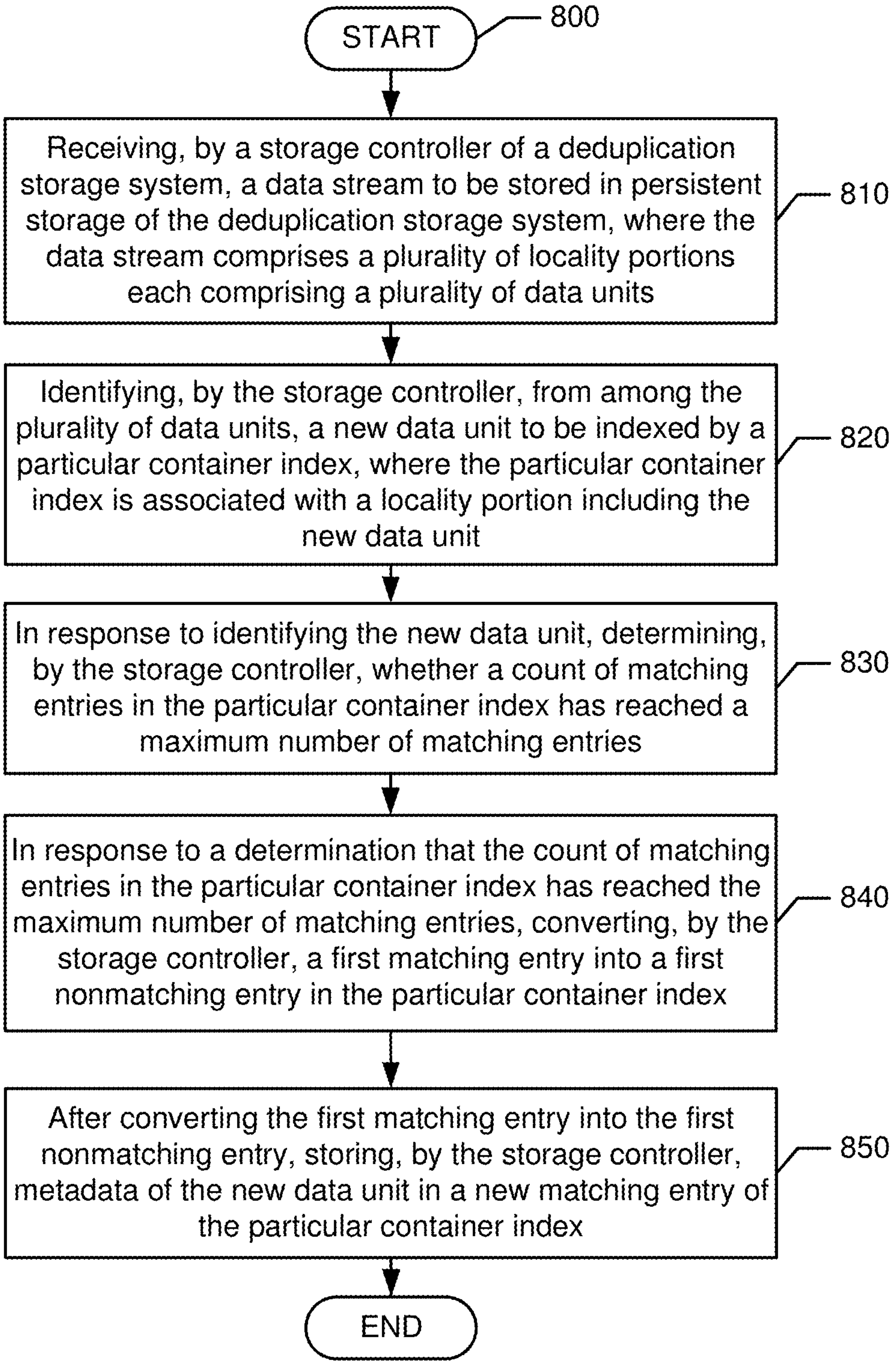
FIG. 8 is an illustration of an example process, in accordance with some implementations.

FIG. 8—Example Process for Updating Container Index Entries

FIG. 8 shows an example process 800 for updating container index entries, in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 810 may include receiving, by a storage controller of a deduplication storage system, a data stream to be stored in persistent storage of the deduplication storage system, where the data stream comprises a plurality of locality portions each comprising a plurality of data units. Block 820 may include identifying, by the storage controller, from among the plurality of data units, a new data unit to be indexed by a particular container index, where the particular container index is associated with a locality portion including the new data unit. Block 830 may include, in response to identifying the new data unit, determining, by the storage controller, whether a count of matching entries in the particular container index has reached a maximum number of matching entries.

Block 840 may include, in response to a determination that the count of matching entries in the particular container index has reached the maximum number of matching entries, converting, by the storage controller, a first matching entry into a first nonmatching entry in the particular container index. Block 850 may include, after converting the first matching entry into the first nonmatching entry, storing, by the storage controller, metadata of the new data unit in a new matching entry of the particular container index. Blocks 810-850 may correspond generally to the examples described above with reference to instructions 710-750 (shown in FIG. 7).

Figure 9:
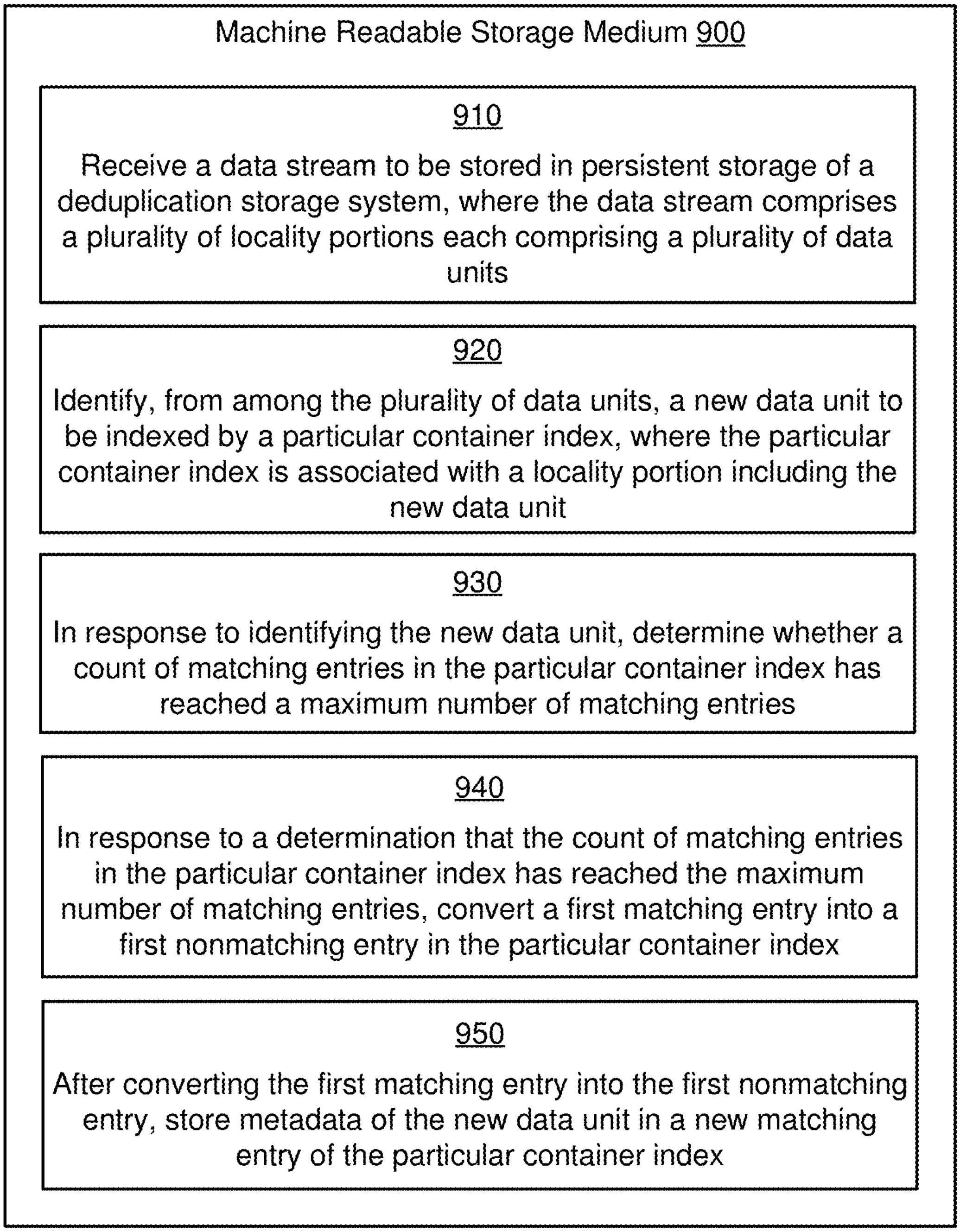
FIG. 9 is a diagram of an example machine-readable medium storing instructions in accordance with some implementations.

FIG. 9—Example Machine-Readable Storage Medium

FIG. 9 shows a machine-readable storage medium 900 including instructions 910-950, in accordance with some implementations. The instructions 910-950 can be executed by a single processor, multiple processors, a single processing engine, multiple processing engines, and so forth. The machine-readable medium 900 may be a non-transitory storage medium, such as an optical, semiconductor, or magnetic storage medium. The instructions 910-950 may correspond generally to the examples described above with reference to instructions 710-750

Instruction 910 may be executed to receive a data stream to be stored in persistent storage of a deduplication storage system, where the data stream comprises a plurality of locality portions each comprising a plurality of data units. Instruction 920 may be executed to identify, from among the plurality of data units, a new data unit to be indexed in a particular container index, where the particular container index is associated with a locality portion including the new data unit.

Instruction 930 may be executed to, in response to identifying the new data unit, determining whether a count of matching entries in the particular container index has reached a maximum number of matching entries. Instruction 940 may be executed to, in response to a determination that the count of matching entries in the particular container index has reached the maximum number of matching entries, convert a first matching entry into a first nonmatching entry in the particular container index. Instruction 950 may be executed to, after converting the first matching entry into the first nonmatching entry, store metadata of the new data unit in a new matching entry of the particular container index.

CONCLUSION

In accordance with some implementations of the present disclosure, a controller of a deduplication storage system may manage container indexes that include matching entries and nonmatching entries. Each matching entry may include a fingerprint for a stored data unit, and may be used to perform matching operations for received data units. If a new matching entry is needed in a container index that has reached its maximum matching limit, the controller may convert an existing matching entry into a nonmatching entry of the container index, and may then add the new matching entry to the container index. In some implementations, the existing matching entry that is converted may be the least recently used matching entry. Further, if any matching entry becomes stale, that matching entry may also be converted to a nonmatching entry of the container index. Each nonmatching entry may not include a fingerprint, and may not be used for matching operations. In some implementations, the nonmatching entry for a data unit may be maintained in a container index, while requiring less storage space than a matching entry for the data unit. Further, if the number of nonmatching entries in the container index reaches the maximum nonmatching limit, the controller may delete a nonmatching entry from the container index. In this manner, the container index may be updated as needed to store metadata for the most recently received data units in the associated locality portion. Accordingly, the controller may maintain the data localization of the metadata in the container indexes, but without causing the stored size of the container indexes to become relatively large.

Note that, while FIGS. 1-9 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
- at least one processor;
- a memory; and
- at least one machine-readable storage medium comprising instructions executable by the at least one processor to:
  - receive a data stream to be stored in persistent storage of a deduplication storage system, wherein the data stream comprises a plurality of data units;
  - identify, from among the data units, a new data unit to be indexed by a particular container index;
  - in response to identifying the new data unit, determine whether a count of matching entries in the particular container index has reached a threshold number of matching entries;
  - in response to a determination that the count of matching entries in the particular container index has reached the threshold number of matching entries, convert a first matching entry, including a fingerprint of a particular data unit, into a first nonmatching entry, that does not include the fingerprint of the particular data unit, in the particular container index; and
  - after converting the first matching entry into the first nonmatching entry, store metadata of the new data unit in a new matching entry of the particular container index.

2. The computing device of claim 1, wherein:
- each matching entry in the particular container index includes a match time value indicating a time of a most recent match, for that matching entry, in matching operations of the deduplication storage system; and
- the first matching entry that is converted includes an oldest match time value among the matching entries in the particular container index.

3. The computing device of claim 2, including instructions executable by the at least one processor to:
- determine, based on the match time value in a second matching entry, an age value for the second matching entry;
- determine whether the age value exceeds an age limit; and
- in response to a determination that the age value exceeds the age limit, convert the second matching entry into a second nonmatching entry in the particular container index.

4. The computing device of claim 1, wherein the first matching entry and the first nonmatching entry both include a reference count for the particular data unit.

5. The computing device of claim 1, including instructions executable by the at least one processor to:
- determine whether the particular container index has sufficient capacity to store a new nonmatching entry; and
- in response to a determination that the particular container index has insufficient capacity to store the new nonmatching entry, store the new nonmatching entry in a different container index.

6. The computing device of claim 5, wherein the different container index has available storage capacity and is associated with a new locality portion that is added to the data stream.

7. The computing device of claim 1, including instructions executable by the at least one processor to:
- identify a particular nonmatching entry including a reference count equal to zero; and
- delete the particular nonmatching entry including the reference count equal to zero.

8. A method comprising:
- receiving, by a storage controller of a deduplication storage system, a data stream to be stored in persistent storage of the deduplication storage system, wherein the data stream comprises a plurality of data units;
- identifying, by the storage controller, from among the plurality of data units, a new data unit to be indexed by a particular container index;
- in response to identifying the new data unit, determining, by the storage controller, whether a count of matching entries in the particular container index has reached a threshold number of matching entries;
- in response to a determination that the count of matching entries in the particular container index has reached the threshold number of matching entries, converting, by the storage controller, a first matching entry, including a fingerprint of a particular data unit, into a first nonmatching entry, that does not include the fingerprint of the particular data unit, in the particular container index; and
- after converting the first matching entry into the first nonmatching entry, storing, by the storage controller, metadata of the new data unit in a new matching entry of the particular container index.

9. The method of claim 8, wherein:
- each matching entry in the particular container index includes a match time value indicating a time of a most recent match, for that matching entry, in matching operations of the deduplication storage system; and
- the first matching entry that is converted includes an oldest match time value among the matching entries in the particular container index.

10. The method of claim 9, comprising:
- determining, based on the match time value in a second matching entry, an age value for the second matching entry;
- determining whether the age value exceeds an age limit; and in response to a determination that the age value exceeds the age limit, converting the second matching entry into a second nonmatching entry in the particular container index.

11. The method of claim 8, wherein:

the first matching entry includes a fingerprint of a particular data unit, the first nonmatching entry excludes the fingerprint of the particular data unit, and the first matching entry and the first nonmatching entry both include a reference count for the particular data unit.

12. The method of claim 8, comprising:

determining whether the particular container index has sufficient capacity to store a new nonmatching entry; and in response to a determination that the particular container index has insufficient capacity to store the new nonmatching entry, storing the new nonmatching entry in a different container index.

13. The method of claim 12, wherein the different container index has available storage capacity and is associated with a new locality portion that is added to the data stream.

14. The method of claim 8, comprising:

identify a particular nonmatching entry including a reference count equal to zero; and delete the particular nonmatching entry including the reference count equal to zero.

15. A non-transitory machine-readable storage medium comprising instructions executable by at least one processor to:

receive a data stream to be stored in persistent storage of a deduplication storage system, wherein the data stream comprises a plurality of data units;

identify, from among the plurality of data units, a new data unit to be indexed by a particular container index;

in response to identifying the new data unit, determine whether a count of matching entries in the particular container index has reached a threshold number of matching entries;

in response to a determination that the count of matching entries in the particular container index has reached the threshold number of matching entries, convert a first matching entry, including a fingerprint of a particular data unit, into a first nonmatching entry, that does not include the fingerprint of the particular data unit, in the particular container index; and after converting the first matching entry into the first nonmatching entry, store metadata of the new data unit in a new matching entry of the particular container index.

16. The non-transitory machine-readable medium of claim 15, wherein:

each matching entry in the particular container index includes a match time value indicating a time of a most recent match, for that matching entry, in matching operations of the deduplication storage system; and the first matching entry that is converted includes an oldest match time value among the matching entries in the particular container index.

17. The non-transitory machine-readable medium of claim 16, including instructions executable by the at least one processor to:

determine, based on the match time value in a second matching entry, an age value for the second matching entry;

determine whether the age value exceeds an age limit; and in response to a determination that the age value exceeds the age limit, convert the second matching entry into a second nonmatching entry in the particular container index.

18. The non-transitory machine-readable medium of claim 15, wherein:

the first matching entry includes a fingerprint of a particular data unit, the first nonmatching entry excludes the fingerprint of the particular data unit, and the first matching entry and the first nonmatching entry both include a reference count for the particular data unit.

19. The non-transitory machine-readable medium of claim 15, including instructions executable by the at least one processor to:

determine whether the particular container index has sufficient capacity to store a new nonmatching entry; and in response to a determination that the particular container index has insufficient capacity to store the new nonmatching entry, store the new nonmatching entry in a different container index has available storage capacity and is associated with a new locality portion that is added to the data stream.

* * * * *